United States Patent
Poupyrev

(10) Patent No.: US 9,778,749 B2
(45) Date of Patent: Oct. 3, 2017

(54) OCCLUDED GESTURE RECOGNITION

(71) Applicant: Google Inc., Mountain View, CA (US)

(72) Inventor: Ivan Poupyrev, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 420 days.

(21) Appl. No.: 14/494,863

(22) Filed: Sep. 24, 2014

(65) Prior Publication Data

US 2016/0054803 A1   Feb. 25, 2016

Related U.S. Application Data

(60) Provisional application No. 62/040,896, filed on Aug. 22, 2014.

(51) Int. Cl.
*G06F 3/01* (2006.01)

(52) U.S. Cl.
CPC .................. *G06F 3/017* (2013.01)

(58) Field of Classification Search
CPC ...................................... G06F 3/017
USPC .......................................... 345/156
See application file for complete search history.

(56) References Cited

U.S. PATENT DOCUMENTS

| | | | |
|---|---|---|---|
| 3,610,874 A | 10/1971 | Gagliano | |
| 3,953,706 A | 4/1976 | Harris et al. | |
| 4,700,044 A | 10/1987 | Hokanson et al. | |
| 4,795,998 A | 1/1989 | Dunbar et al. | |
| 4,838,797 A | 6/1989 | Dodier | |
| 5,298,715 A | 3/1994 | Chalco et al. | |
| 5,341,979 A | 8/1994 | Gupta | |
| 5,468,917 A | 11/1995 | Brodsky et al. | |
| 5,564,571 A | 10/1996 | Zanotti | |
| 5,656,798 A | 8/1997 | Kubo et al. | |
| 5,724,707 A | 3/1998 | Kirk et al. | |
| 5,798,798 A | 8/1998 | Rector et al. | |
| 6,032,450 A | 3/2000 | Blum | |
| 6,080,690 A | 6/2000 | Lebby et al. | |
| 6,210,771 B1 | 4/2001 | Post et al. | |
| 6,313,825 B1 | 11/2001 | Gilbert | |
| 6,340,979 B1 | 1/2002 | Beaton et al. | |

(Continued)

FOREIGN PATENT DOCUMENTS

| CN | 202887794 | 4/2013 |
|---|---|---|
| CN | 103355860 | 1/2016 |

(Continued)

OTHER PUBLICATIONS

"Philips Vital Signs Camera", Retrieved From: <http://www.vitalsignscamera.com/>Apr. 15, 2015, Jul. 17, 2013, 2 pages.

(Continued)

*Primary Examiner* — Jason Olson
(74) *Attorney, Agent, or Firm* — Colby Nipper

(57) ABSTRACT

This document describes techniques and devices for occluded gesture recognition. Through use of the techniques and devices described herein, users may control their devices even when a user's gesture is occluded by some material between the user's hands and the device itself. Thus, the techniques enable users to control their mobile devices in many situations in which control is desired but conventional techniques do permit effective control, such as when a user's mobile computing device is occluded by being in a purse, bag, pocket, or even in another room.

20 Claims, 7 Drawing Sheets

(56) References Cited

U.S. PATENT DOCUMENTS

| | | | |
|---|---|---|---|
| 6,386,757 B1 | 5/2002 | Konno | |
| 6,440,593 B2 | 8/2002 | Ellison et al. | |
| 6,492,980 B2 | 12/2002 | Sandbach | |
| 6,493,933 B1 | 12/2002 | Post et al. | |
| 6,513,970 B1 | 2/2003 | Tabata et al. | |
| 6,543,668 B1 | 4/2003 | Fujii et al. | |
| 6,616,613 B1 | 9/2003 | Goodman | |
| 6,711,354 B2 | 3/2004 | Kameyama | |
| 6,717,065 B2 | 4/2004 | Hosaka et al. | |
| 6,802,720 B2 | 10/2004 | Weiss et al. | |
| 6,835,898 B2 | 12/2004 | Eldridge et al. | |
| 6,854,985 B1 | 2/2005 | Weiss | |
| 6,929,484 B2 | 8/2005 | Weiss et al. | |
| 7,134,879 B2 | 11/2006 | Sugimoto et al. | |
| 7,223,105 B2 | 5/2007 | Weiss et al. | |
| 7,249,954 B2 | 7/2007 | Weiss | |
| 7,299,964 B2 | 11/2007 | Jayaraman et al. | |
| 7,310,236 B2 | 12/2007 | Takahashi et al. | |
| 7,317,416 B2 | 1/2008 | Flom et al. | |
| 7,348,285 B2 | 3/2008 | Dhawan et al. | |
| 7,365,031 B2 | 4/2008 | Swallow et al. | |
| 7,421,061 B2 | 9/2008 | Boese et al. | |
| 7,462,035 B2 | 12/2008 | Lee et al. | |
| 7,578,195 B2 | 8/2009 | DeAngelis et al. | |
| 7,644,488 B2 | 1/2010 | Aisenbrey | |
| 7,670,144 B2 | 3/2010 | Ito et al. | |
| 7,677,729 B2 | 3/2010 | Vilser et al. | |
| 7,691,067 B2 | 4/2010 | Westbrook et al. | |
| 7,698,154 B2 | 4/2010 | Marchosky | |
| 7,791,700 B2 | 9/2010 | Bellamy | |
| 7,834,276 B2 | 11/2010 | Chou et al. | |
| 7,952,512 B1 | 5/2011 | Delker et al. | |
| 8,062,220 B2 | 11/2011 | Kurtz et al. | |
| 8,169,404 B1 | 5/2012 | Boillot | |
| 8,179,604 B1 * | 5/2012 | Prada Gomez | G02B 27/0093 345/8 |
| 8,282,232 B2 | 10/2012 | Hsu et al. | |
| 8,289,185 B2 | 10/2012 | Alonso | |
| 8,301,232 B2 | 10/2012 | Albert et al. | |
| 8,334,226 B2 | 12/2012 | Nhan et al. | |
| 8,341,762 B2 | 1/2013 | Balzano | |
| 8,367,942 B2 | 2/2013 | Howell et al. | |
| 8,475,367 B1 | 7/2013 | Yuen et al. | |
| 8,505,474 B2 | 8/2013 | Kang et al. | |
| 8,549,829 B2 | 10/2013 | Song et al. | |
| 8,560,972 B2 | 10/2013 | Wilson | |
| 8,569,189 B2 | 10/2013 | Bhattacharya et al. | |
| 8,614,689 B2 | 12/2013 | Nishikawa et al. | |
| 8,655,004 B2 | 2/2014 | Prest et al. | |
| 8,700,137 B2 | 4/2014 | Albert | |
| 8,758,020 B2 | 6/2014 | Burdea et al. | |
| 8,759,713 B2 | 6/2014 | Sheats | |
| 8,764,651 B2 | 7/2014 | Tran | |
| 8,785,778 B2 | 7/2014 | Streeter et al. | |
| 8,790,257 B2 | 7/2014 | Libbus et al. | |
| 8,814,574 B2 | 8/2014 | Selby et al. | |
| 9,055,879 B2 | 6/2015 | Selby et al. | |
| 9,093,289 B2 | 7/2015 | Vicard et al. | |
| 9,125,456 B2 | 9/2015 | Chow | |
| 9,141,194 B1 | 9/2015 | Keyes et al. | |
| 9,148,949 B2 | 9/2015 | Zhou et al. | |
| 9,230,160 B1 | 1/2016 | Kanter | |
| 9,331,422 B2 | 5/2016 | Nazzaro et al. | |
| 9,335,825 B2 | 5/2016 | Rautiainen et al. | |
| 9,575,560 B2 | 2/2017 | Poupyrev et al. | |
| 9,588,625 B2 | 3/2017 | Poupyrev | |
| 9,594,443 B2 * | 3/2017 | VanBlon | G06F 3/03545 |
| 9,600,080 B2 | 3/2017 | Poupyrev | |
| 9,693,592 B2 | 7/2017 | Robinson et al. | |
| 2002/0080156 A1 | 6/2002 | Abbott et al. | |
| 2002/0170897 A1 | 11/2002 | Hall | |
| 2003/0100228 A1 | 5/2003 | Bungo et al. | |
| 2003/0119391 A1 | 6/2003 | Swallow et al. | |
| 2004/0009729 A1 | 1/2004 | Hill et al. | |
| 2005/0069695 A1 | 3/2005 | Jung et al. | |
| 2005/0148876 A1 * | 7/2005 | Endoh | A61B 5/117 600/454 |
| 2006/0035554 A1 | 2/2006 | Glaser et al. | |
| 2006/0040739 A1 | 2/2006 | Wells | |
| 2006/0157734 A1 | 7/2006 | Onodera et al. | |
| 2006/0166620 A1 | 7/2006 | Sorensen | |
| 2006/0258205 A1 | 11/2006 | Locher et al. | |
| 2007/0026695 A1 | 2/2007 | Lee et al. | |
| 2007/0118043 A1 | 5/2007 | Oliver et al. | |
| 2007/0161921 A1 | 7/2007 | Rausch | |
| 2007/0176821 A1 | 8/2007 | Flom et al. | |
| 2007/0192647 A1 | 8/2007 | Glaser | |
| 2007/0197878 A1 | 8/2007 | Shklarski | |
| 2007/0210074 A1 | 9/2007 | Maurer et al. | |
| 2008/0002027 A1 | 1/2008 | Kondo et al. | |
| 2008/0024438 A1 | 1/2008 | Collins et al. | |
| 2008/0065291 A1 | 3/2008 | Breed | |
| 2008/0134102 A1 | 6/2008 | Movold et al. | |
| 2008/0136775 A1 | 6/2008 | Conant | |
| 2008/0168396 A1 | 7/2008 | Matas et al. | |
| 2008/0211766 A1 * | 9/2008 | Westerman | G06F 3/038 345/156 |
| 2008/0233822 A1 | 9/2008 | Swallow et al. | |
| 2008/0282665 A1 | 11/2008 | Speleers | |
| 2008/0291158 A1 | 11/2008 | Park et al. | |
| 2008/0316085 A1 | 12/2008 | Rofougaran et al. | |
| 2008/0320419 A1 | 12/2008 | Matas et al. | |
| 2009/0018408 A1 | 1/2009 | Ouchi et al. | |
| 2009/0033585 A1 | 2/2009 | Lang | |
| 2009/0053950 A1 | 2/2009 | Surve | |
| 2009/0056300 A1 | 3/2009 | Chung et al. | |
| 2009/0113298 A1 | 4/2009 | Jung et al. | |
| 2009/0115617 A1 | 5/2009 | Sano et al. | |
| 2009/0149036 A1 | 6/2009 | Lee et al. | |
| 2009/0203244 A1 | 8/2009 | Toonder | |
| 2009/0270690 A1 | 10/2009 | Roos et al. | |
| 2009/0288762 A1 | 11/2009 | Wolfel | |
| 2009/0295712 A1 * | 12/2009 | Ritzau | G06F 1/1626 345/156 |
| 2010/0065320 A1 | 3/2010 | Urano | |
| 2010/0071205 A1 | 3/2010 | Graumann et al. | |
| 2010/0094141 A1 | 4/2010 | Puswella | |
| 2010/0201586 A1 | 8/2010 | Michalk | |
| 2010/0205667 A1 | 8/2010 | Anderson et al. | |
| 2010/0208035 A1 | 8/2010 | Pinault et al. | |
| 2010/0225562 A1 | 9/2010 | Smith | |
| 2010/0281438 A1 | 11/2010 | Latta et al. | |
| 2010/0292549 A1 | 11/2010 | Shuler | |
| 2010/0306713 A1 | 12/2010 | Geisner et al. | |
| 2010/0313414 A1 | 12/2010 | Sheats | |
| 2010/0324384 A1 | 12/2010 | Moon et al. | |
| 2010/0325770 A1 | 12/2010 | Chung et al. | |
| 2011/0003664 A1 | 1/2011 | Richard | |
| 2011/0010014 A1 | 1/2011 | Oexman et al. | |
| 2011/0073353 A1 | 3/2011 | Lee et al. | |
| 2011/0093820 A1 | 4/2011 | Zhang et al. | |
| 2011/0181509 A1 | 7/2011 | Rautiainen et al. | |
| 2011/0181510 A1 * | 7/2011 | Hakala | G06F 3/017 345/158 |
| 2011/0197263 A1 * | 8/2011 | Stinson, III | G06F 3/011 726/4 |
| 2011/0202404 A1 | 8/2011 | van der Riet | |
| 2011/0213218 A1 | 9/2011 | Weiner et al. | |
| 2011/0221666 A1 | 9/2011 | Newton et al. | |
| 2011/0234492 A1 | 9/2011 | Ajmera et al. | |
| 2011/0239118 A1 * | 9/2011 | Yamaoka | G06F 3/017 715/709 |
| 2011/0245688 A1 | 10/2011 | Arora et al. | |
| 2011/0279303 A1 | 11/2011 | Smith, Jr. | |
| 2011/0303341 A1 | 12/2011 | Meiss et al. | |
| 2011/0307842 A1 * | 12/2011 | Chiang | G02C 11/04 715/863 |
| 2011/0318985 A1 | 12/2011 | McDermid | |
| 2012/0019168 A1 | 1/2012 | Noda et al. | |
| 2012/0029369 A1 | 2/2012 | Icove et al. | |
| 2012/0047468 A1 | 2/2012 | Santos et al. | |
| 2012/0068876 A1 | 3/2012 | Bangera et al. | |
| 2012/0092284 A1 | 4/2012 | Rofougaran et al. | |
| 2012/0123232 A1 | 5/2012 | Najarian et al. | |

(56) References Cited

U.S. PATENT DOCUMENTS

| | | |
|---|---|---|
| 2012/0127082 A1 | 5/2012 | Kushler et al. |
| 2012/0144934 A1 | 6/2012 | Russell et al. |
| 2012/0156926 A1 | 6/2012 | Kato et al. |
| 2012/0174299 A1 | 7/2012 | Balzano |
| 2012/0174736 A1 | 7/2012 | Wang et al. |
| 2012/0193801 A1 | 8/2012 | Gross et al. |
| 2012/0220835 A1 | 8/2012 | Chung |
| 2012/0248093 A1 | 10/2012 | Ulrich et al. |
| 2012/0254810 A1 | 10/2012 | Heck et al. |
| 2012/0268416 A1 | 10/2012 | Pirogov et al. |
| 2012/0280900 A1 | 11/2012 | Wang et al. |
| 2012/0310665 A1 | 12/2012 | Xu et al. |
| 2013/0016070 A1 | 1/2013 | Starner et al. |
| 2013/0053653 A1 | 2/2013 | Cuddihy et al. |
| 2013/0083173 A1 | 4/2013 | Geisner et al. |
| 2013/0102217 A1 | 4/2013 | Jeon |
| 2013/0104084 A1 | 4/2013 | Mlyniec et al. |
| 2013/0132931 A1 | 5/2013 | Bruns et al. |
| 2013/0150735 A1 | 6/2013 | Cheng |
| 2013/0161078 A1 | 6/2013 | Li |
| 2013/0194173 A1 | 8/2013 | Zhu et al. |
| 2013/0195330 A1 | 8/2013 | Kim et al. |
| 2013/0196716 A1 | 8/2013 | Muhammad |
| 2013/0207962 A1 | 8/2013 | Oberdorfer et al. |
| 2013/0278499 A1 | 10/2013 | Anderson |
| 2013/0278501 A1 | 10/2013 | Bulzacki |
| 2013/0322729 A1 | 12/2013 | Mestha et al. |
| 2013/0332438 A1 | 12/2013 | Li et al. |
| 2013/0345569 A1 | 12/2013 | Mestha et al. |
| 2014/0005809 A1 | 1/2014 | Frei et al. |
| 2014/0049487 A1 | 2/2014 | Konertz et al. |
| 2014/0051941 A1 | 2/2014 | Messerschmidt |
| 2014/0070957 A1 | 3/2014 | Longinotti-Buitoni et al. |
| 2014/0072190 A1 | 3/2014 | Wu et al. |
| 2014/0073486 A1 | 3/2014 | Ahmed et al. |
| 2014/0073969 A1 | 3/2014 | Zou et al. |
| 2014/0081100 A1 | 3/2014 | Muhsin et al. |
| 2014/0095480 A1 | 4/2014 | Marantz et al. |
| 2014/0121540 A1 | 5/2014 | Raskin |
| 2014/0135631 A1 | 5/2014 | Brumback et al. |
| 2014/0139422 A1 | 5/2014 | Mistry et al. |
| 2014/0139616 A1 | 5/2014 | Pinter et al. |
| 2014/0143678 A1 | 5/2014 | Mistry et al. |
| 2014/0184496 A1 | 7/2014 | Gribetz et al. |
| 2014/0191939 A1 | 7/2014 | Penn et al. |
| 2014/0200416 A1 | 7/2014 | Kashef et al. |
| 2014/0208275 A1 | 7/2014 | Mongia et al. |
| 2014/0215389 A1 | 7/2014 | Walsh et al. |
| 2014/0239065 A1 | 8/2014 | Zhou et al. |
| 2014/0244277 A1 | 8/2014 | Krishna Rao et al. |
| 2014/0246415 A1 | 9/2014 | Wittkowski |
| 2014/0250515 A1* | 9/2014 | Jakobsson .............. H04L 9/3231 726/7 |
| 2014/0253431 A1 | 9/2014 | Gossweiler et al. |
| 2014/0253709 A1 | 9/2014 | Bresch et al. |
| 2014/0262478 A1 | 9/2014 | Harris et al. |
| 2014/0275854 A1 | 9/2014 | Venkatraman et al. |
| 2014/0280295 A1 | 9/2014 | Kurochkin et al. |
| 2014/0281975 A1 | 9/2014 | Anderson |
| 2014/0297006 A1 | 10/2014 | Sadhu |
| 2014/0306936 A1 | 10/2014 | Dahl et al. |
| 2014/0316261 A1 | 10/2014 | Lux et al. |
| 2014/0318699 A1 | 10/2014 | Longinotti-Buitoni et al. |
| 2014/0324888 A1 | 10/2014 | Xie et al. |
| 2014/0347295 A1 | 11/2014 | Kim et al. |
| 2014/0357369 A1 | 12/2014 | Callens et al. |
| 2015/0002391 A1 | 1/2015 | Chen |
| 2015/0009096 A1 | 1/2015 | Lee et al. |
| 2015/0026815 A1 | 1/2015 | Barrett |
| 2015/0029050 A1 | 1/2015 | Driscoll et al. |
| 2015/0040040 A1 | 2/2015 | Balan et al. |
| 2015/0046183 A1 | 2/2015 | Cireddu |
| 2015/0068069 A1 | 3/2015 | Tran et al. |
| 2015/0077282 A1 | 3/2015 | Mohamadi |
| 2015/0085060 A1 | 3/2015 | Fish et al. |
| 2015/0091858 A1 | 4/2015 | Rosenberg et al. |
| 2015/0099941 A1 | 4/2015 | Tran |
| 2015/0100328 A1 | 4/2015 | Kress et al. |
| 2015/0112606 A1 | 4/2015 | He et al. |
| 2015/0133017 A1 | 5/2015 | Liao et al. |
| 2015/0145805 A1 | 5/2015 | Liu |
| 2015/0162729 A1 | 6/2015 | Reversat et al. |
| 2015/0199045 A1 | 7/2015 | Robucci et al. |
| 2015/0261320 A1 | 9/2015 | Leto |
| 2015/0268027 A1 | 9/2015 | Gerdes |
| 2015/0268799 A1 | 9/2015 | Starner et al. |
| 2015/0277569 A1* | 10/2015 | Sprenger .................. G06F 3/017 345/156 |
| 2015/0287187 A1 | 10/2015 | Redtel |
| 2015/0312041 A1* | 10/2015 | Choi .................... H04L 9/3231 713/175 |
| 2015/0332075 A1 | 11/2015 | Burch |
| 2015/0346820 A1 | 12/2015 | Poupyrev et al. |
| 2015/0375339 A1 | 12/2015 | Sterling et al. |
| 2016/0018948 A1 | 1/2016 | Parvarandeh et al. |
| 2016/0038083 A1 | 2/2016 | Ding et al. |
| 2016/0041617 A1 | 2/2016 | Poupyrev |
| 2016/0041618 A1 | 2/2016 | Poupyrev |
| 2016/0048235 A1 | 2/2016 | Poupyrev |
| 2016/0048236 A1 | 2/2016 | Poupyrev |
| 2016/0054792 A1 | 2/2016 | Poupyrev |
| 2016/0054804 A1 | 2/2016 | Gollakata et al. |
| 2016/0055201 A1 | 2/2016 | Poupyrev et al. |
| 2016/0098089 A1 | 4/2016 | Poupyrev |
| 2016/0100166 A1 | 4/2016 | Dragne et al. |
| 2016/0103500 A1 | 4/2016 | Hussey et al. |
| 2016/0106328 A1 | 4/2016 | Mestha et al. |
| 2016/0145776 A1 | 5/2016 | Roh |
| 2016/0213331 A1 | 7/2016 | Gil et al. |
| 2016/0216825 A1 | 7/2016 | Forutanpour |
| 2016/0249698 A1 | 9/2016 | Berzowska et al. |
| 2016/0259037 A1 | 9/2016 | Molchanov et al. |
| 2016/0282988 A1 | 9/2016 | Poupyrev |
| 2016/0283101 A1 | 9/2016 | Schwesig et al. |
| 2016/0284436 A1 | 9/2016 | Fukuhara et al. |
| 2016/0299526 A1 | 10/2016 | Inagaki et al. |
| 2016/0320852 A1 | 11/2016 | Poupyrev |
| 2016/0320853 A1 | 11/2016 | Lien et al. |
| 2016/0320854 A1 | 11/2016 | Lien et al. |
| 2016/0321428 A1 | 11/2016 | Rogers |
| 2016/0338599 A1 | 11/2016 | DeBusschere et al. |
| 2016/0345638 A1 | 12/2016 | Robinson et al. |
| 2016/0349790 A1 | 12/2016 | Connor |
| 2016/0349845 A1 | 12/2016 | Poupyrev et al. |
| 2017/0097413 A1 | 4/2017 | Gillian et al. |
| 2017/0097684 A1 | 4/2017 | Lien |
| 2017/0115777 A1 | 4/2017 | Poupyrev |
| 2017/0125940 A1 | 5/2017 | Karagozler et al. |
| 2017/0232538 A1 | 8/2017 | Robinson et al. |

FOREIGN PATENT DOCUMENTS

| | | |
|---|---|---|
| DE | 102011075725 | 11/2012 |
| DE | 102013201359 | 7/2014 |
| EP | 0161895 | 11/1985 |
| EP | 1815788 | 8/2007 |
| EP | 3201726 | 8/2017 |
| GB | 2443208 | 4/2008 |
| JP | 2006234716 | 9/2006 |
| JP | 2011102457 | 5/2011 |
| WO | WO-9001895 | 3/1990 |
| WO | WO-0127855 | 4/2001 |
| WO | WO-0130123 | 4/2001 |
| WO | WO-0175778 | 10/2001 |
| WO | WO-02082999 | 10/2002 |
| WO | WO-2005033387 | 4/2005 |
| WO | 2007125298 | 11/2007 |
| WO | WO-2008061385 | 5/2008 |
| WO | WO-2009032073 | 3/2009 |
| WO | WO-2010032173 | 3/2010 |
| WO | WO-2012026013 | 3/2012 |
| WO | WO-2012152476 | 11/2012 |
| WO | WO-2013082806 | 6/2013 |
| WO | WO-2013084108 | 6/2013 |

(56) References Cited

FOREIGN PATENT DOCUMENTS

| WO | WO-2013186696 | 12/2013 |
|---|---|---|
| WO | WO-2013191657 | 12/2013 |
| WO | WO-2013192166 | 12/2013 |
| WO | WO-2014019085 | 2/2014 |
| WO | WO-2014116968 | 7/2014 |
| WO | WO-2014124520 | 8/2014 |
| WO | WO-2014136027 | 9/2014 |
| WO | WO-2014138280 | 9/2014 |
| WO | WO-2014160893 | 10/2014 |
| WO | WO-2014165476 | 10/2014 |
| WO | WO-2014204323 | 12/2014 |
| WO | WO-2015017931 | 2/2015 |
| WO | WO-2015022671 | 2/2015 |
| WO | 2016053624 | 4/2016 |

OTHER PUBLICATIONS

"Cardiio", Retrieved From: <http://www.cardiio.com/> Apr. 15, 2015 App Information Retrieved From: <https://itunes.apple.com/us/app/cardiio-touchless-camera-pulse/id542891434?ls=1&mt=8> Apr. 15, 2015, Feb. 24, 2015, 6 pages.
Balakrishnan,"Detecting Pulse from Head Motions in Video", In Proceedings: CVPR '13 Proceedings of the 2013 IEEE Conference on Computer Vision and Pattern Recognition Available at: <http://people.csail.mit.edu/mrub/vidmag/papers/Balakrishnan_Detecting_Pulse_from_2013_CVPR_paper.pdf>, Jun. 23, 2013, 8 pages.
Couderc,"Detection of Atrial Fibrillation using Contactless Facial Video Monitoring", In Proceedings: Heart Rhythm Society, vol. 12, Issue 1 Available at: <http://www.heartrhythmjournal.com/article/S1547-5271(14)00924-2/pdf>, Jan. 2015, 7 pages.
Poh,"A Medical Mirror for Non-contact Health Monitoring", In Proceedings: ACM SIGGRAPH Emerging Technologies Available at: <http://affect.media.mit.edu/pdfs/11.Poh-etal-SIGGRAPH.pdf>, 2011, 1 page.
Poh,"Non-contact, Automated Cardiac Pulse Measurements Using Video Imaging and Blind Source Separation.", In Proceedings: Optics Express, vol. 18, No. 10 Available at: <http://www.opticsinfobase.org/view_article.cfm?gotourl=http%3A%2F%2Fwww%2Eopticsinfobase%2Eorg%2FDirectPDFAccess%2F7B94D55%2DBC95%4D6037%2D5BAC%49A426378C02%5F199381%2 May 7, 2010, 13 pages.
Wang,"Exploiting Spatial Redundancy of Image Sensor for Motion Robust rPPG", In Proceedings: IEEE Transactions on Biomedical Engineering, vol. 62, Issue 2, Jan. 19, 2015, 11 pages.
"International Search Report and Written Opinion", Application No. PCT/US2015/043963, Nov. 24, 2015, 16 pages.
"International Search Report and Written Opinion", Application No. PCT/US2015/043949, Dec. 1, 2015, 18 pages.
Zhadobov,"Millimeter-wave Interactions with the Human Body: State of Knowledge and Recent Advances", International Journal of Microwave and Wireless Technologies, Mar. 1, 2011, 11 pages.
"International Search Report and Written Opinion", Application No. PCT/US2016/029820, Jul. 15, 2016, 14 pages.
"Non-Final Office Action", U.S. Appl. No. 14/582,896, Jun. 29, 2016, 9 pages.
"Non-Final Office Action", U.S. Appl. No. 14/681,625, Aug. 12, 2016, 9 pages.
"Restriction Requirement", U.S. Appl. No. 14/666,155, Jul. 22, 2016, 5 pages.
"The Instant Blood Pressure app estimates blood pressure with your smartphone and our algorithm", Retrieved at: http://www.instantbloodpressure.com/—on Jun. 23, 2016, 6 pages.
"Extended European Search Report", EP Application No. 15170577.9, Nov. 5, 2015, 12 pages.
"Final Office Action", U.S. Appl. No. 14/312,486, Jun. 3, 2016, 32 pages.
"Final Office Action", U.S. Appl. No. 14/504,038, Sep. 27, 2016, 23 pages.
"Final Office Action", U.S. Appl. No. 14/504,061, Mar. 9, 2016, 10 pages.
"Frogpad Introduces Wearable Fabric Keyboard with Bluetooth Technology", Retrieved From: <http://www.geekzone.co.nz/content.asp?contentid=3898> Mar. 16, 2015, Jan. 7, 2005, 2 pages.
"International Search Report and Written Opinion", Application No. PCT/US2015/044774, Nov. 3, 2015, 12 pages.
"International Search Report and Written Opinion", Application No. PCT/US2016/024267, Jun. 20, 2016, 13 pages.
"International Search Report and Written Opinion", Application No. PCT/US2016/024273, Jun. 20, 2016, 13 pages.
"International Search Report and Written Opinion", Application No. PCT/US2016/032307, Aug. 25, 2016, 13 pages.
"International Search Report and Written Opinion", Application No. PCT/US2016/030177, Aug. 2, 2016, 15 pages.
"International Search Report and Written Opinion", Application No. PCT/US2016/030115, Aug. 8, 2016, 18 pages.
"Non-Final Office Action", U.S. Appl. No. 14/312,486, Oct. 23, 2015, 25 pages.
"Non-Final Office Action", U.S. Appl. No. 14/504,061, Nov. 4, 2015, 8 pages.
"Non-Final Office Action", U.S. Appl. No. 14/666,155, Aug. 24, 2016, 9 pages.
"Non-Final Office Action", U.S. Appl. No. 14/930,220, Sep. 14, 2016, 15 pages.
"Notice of Allowance", U.S. Appl. No. 14/504,061, Sep. 12, 2016, 7 pages.
Arbabian,"A 94GHz mm-Wave to Baseband Pulsed-Radar for Imaging and Gesture Recognition", 2012 IEEE, 2012 Symposium on VLSI Circuits Digest of Technical Papers, 2012, 2 pages.
Espina,"Wireless Body Sensor Network for Continuous Cuff-less Blood Pressure Monitoring", International Summer School on Medical Devices and Biosensors, 2006, Sep. 2006, 5 pages.
Godana,"Human Movement Characterization in Indoor Environment using GNU Radio Based Radar", Retrieved at: http://repository.tudelft.nl/islandora/object/uuid:414e1868-dd00-4113-9989-4c213f1f7094?collection=education, Nov. 30, 2009, 100 pages.
Holleis,"Evaluating Capacitive Touch Input on Clothes", Proceedings of the 10th International Conference on Human Computer Interaction, Jan. 1, 2008, 10 pages.
Patel,"Applications of Electrically Conductive Yarns in Technical Textiles", International Conference on Power System Technology (POWECON), Oct. 30, 2012, 6 pages.
Wang,"Micro-Doppler Signatures for Intelligent Human Gait Recognition Using a UWB Impulse Radar", 2011 IEEE International Symposium on Antennas and Propagation (APSURSI), Jul. 3, 2011, pp. 2103-2106.
Wijesiriwardana,"Capacitive Fibre-Meshed Transducer for Touch & Proximity Sensing Applications", IEEE Sensors Journal, IEEE Service Center, Oct. 1, 2005, 5 pages.
Zhang,"Study of the Structural Design and Capacitance Characteristics of Fabric Sensor", Advanced Materials Research (vols. 194-196), Feb. 21, 2011, 8 pages.
"Corrected Notice of Allowance", U.S. Appl. No. 14/312,486, Oct. 28, 2016, 4 pages.
"International Search Report and Written Opinion", Application No. PCT/US2016/033342, Oct. 27, 2016, 20 pages.
"Non-Final Office Action", U.S. Appl. No. 14/518,863, Oct. 14, 2016, 16 pages.
"Notice of Allowance", U.S. Appl. No. 14/312,486, Oct. 7, 2016, 15 pages.
"Notice of Allowance", U.S. Appl. No. 14/582,896, Nov. 7, 2016, 5 pages.
"Pre-Interview Communication", U.S. Appl. No. 14/513,875, Oct. 21, 2016, 3 pages.
Matthews,"Venous Pulse", Retrieved at: http://www.rjmatthewsmd.com/Definitions/venous_pulse.htm—on Nov. 30, 2016, Apr. 13, 2013, 7 pages.
Pu,"Gesture Recognition Using Wireless Signals", Oct. 2014, pp. 15-18.
"Corrected Notice of Allowance", U.S. Appl. No. 14/504,061, Dec. 27, 2016, 2 pages.

(56) References Cited

OTHER PUBLICATIONS

"Corrected Notice of Allowance", U.S. Appl. No. 14/582,896, Dec. 19, 2016, 2 pages.
"Final Office Action", U.S. Appl. No. 14/681,625, Dec. 7, 2016, 10 pages.
"International Search Report and Written Opinion", Application No. PCT/US2016/042013, Oct. 26, 2016, 12 pages.
"International Search Report and Written Opinion", Application No. PCT/US2016/024289, Aug. 25, 2016, 17 pages.
Cheng,"Smart Textiles: From Niche to Mainstream", IEEE Pervasive Computing, Jul. 2013, pp. 81-84.
Farringdon,"Wearable Sensor Badge & Sensor Jacket for Context Awareness", Third International Symposium on Wearable Computers, Oct. 1999, 7 pages.
Schneegass,"Towards a Garment OS: Supporting Application Development for Smart Garments", Wearable Computers, ACM, Sep. 2014, 6 pages.
He "A Continuous, Wearable, and Wireless Heart Monitor Using Head Ballistocardiogram (BCG) and Head Electrocardiogram (ECG) with a Nanowatt ECG Heartbeat Detection Circuit", In Proceedings: Thesis, Department of Electrical Engineering and Computer Science, Massachusetts Institute of Technology Available at: <http://dspace.mit.edu/handle/1721.1/79221>, Feb. 2013, 137 pages.
Nakajima, et al., "Development of Real-Time Image Sequence Analysis for Evaluating Posture Change and Respiratory Rate of a Subject in Bed", In Proceedings: Physiological Measurement, vol. 22, No. 3, Retrieved From: <http://iopscience.iop.org/0967-3334/22/3/401/pdf/0967-3334_22_3_401.pdf> Feb. 27, 2015, Aug. 2001, 8 pages.
"International Search Report and Written Opinion", Application No. PCT/US2015/050903, Feb. 19, 2016, 18 pages.
"Non-Final Office Action", U.S. Appl. No. 14/504,038, Feb. 26, 2016, 22 pages.
Pu,"Whole-Home Gesture Recognition Using Wireless Signals", MobiCom '13 Proceedings of the 19th annual international conference on Mobile computing & networking, Aug. 27, 2013, 12 pages.
"Corrected Notice of Allowance", U.S. Appl. No. 14/312,486, Jan. 23, 2017, 4 pages.
"Corrected Notice of Allowance", U.S. Appl. No. 14/582,896, Feb. 6, 2017, 2 pages.
"Corrected Notice of Allowance", U.S. Appl. No. 14/582,896, Feb. 23, 2017, 2 pages.
"International Preliminary Report on Patentability", Application No. PCT/US2015/043963, Feb. 16, 2017, 12 pages.
"International Preliminary Report on Patentability", Application No. PCT/US2015/030388, Dec. 15, 2016, 12 pages.
"International Preliminary Report on Patentability", Application No. PCT/US2015/043949, Feb. 16, 2017, 13 pages.
"International Preliminary Report on Patentability", Application No. PCT/US2015/044774, Mar. 2, 2017, 8 pages.
"International Search Report and Written Opinion", Application No. PCT/US2016/062082, Feb. 23, 2017, 12 pages.
"International Search Report and Written Opinion", Application No. PCT/US2016/055671, Dec. 1, 2016, 14 pages.
"Life:X Lifestyle eXplorer", Retrieved from <https://web.archive.org/web/20150318093841/http://research.microsoft.com/en-us/projects/lifex >, Feb. 3, 2017, 2 pages.
"Non-Final Office Action", U.S. Appl. No. 14/504,121, Jan. 9, 2017, 13 pages.
"Non-Final Office Action", U.S. Appl. No. 14/504,139, Jan. 27, 2017, 10 pages.
"Non-Final Office Action", U.S. Appl. No. 14/513,875, Feb. 21, 2017, 9 pages.
"Non-Final Office Action", U.S. Appl. No. 14/666,155, Feb. 3, 2017, 12 pages.
"Non-Final Office Action", U.S. Appl. No. 14/681,625, Mar. 6, 2017, 7 pages.
"Non-Final Office Action", U.S. Appl. No. 14/874,955, Feb. 27, 2017, 8 pages.
"Non-Final Office Action", U.S. Appl. No. 14/959,799, Jan. 27, 2017, 10 pages.
"Notice of Allowance", U.S. Appl. No. 14/930,220, Feb. 2, 2017, 8 pages.
"Pre-Interview Communication", U.S. Appl. No. 14/959,730, Feb. 15, 2017, 3 pages.
"Pre-Interview Communication", U.S. Appl. No. 14/959,901, Feb. 10, 2017, 3 pages.
"The Dash smart earbuds play back music, and monitor your workout", Retrieved from < http://newatlas.com/bragi-dash-tracking-earbuds/30808/>, Feb. 13, 2014, 3 pages.
Palese,"The Effects of Earphones and Music on the Temperature Measured by Infrared Tympanic Thermometer: Preliminary Results", ORL—head and neck nursing: official journal of the Society of Otorhinolaryngology and Head-Neck Nurses 32.2, 2013, pp. 8-12.
"Corrected Notice of Allowance", U.S. Appl. No. 14/930,220, Mar. 20, 2017, 2 pages.
"First Action Interview Office Action", U.S. Appl. No. 14/959,901, Apr. 14, 2017, 3 pages.
"International Search Report and Written Opinion", Application No. PCT/US2016/060399, Jan. 30, 2017, 11 pages.
"Non-Final Office Action", U.S. Appl. No. 14/504,038, Mar. 22, 2017, 33 pages.
"Non-Final Office Action", U.S. Appl. No. 15/398,147, Mar. 9, 2017, 10 pages.
"Pre-Interview Communication", U.S. Appl. No. 14/715,454, Apr. 14, 2017, 3 pages.
"Pre-Interview Communication", U.S. Appl. No. 14/715,793, Mar. 20, 2017, 3 pages.
"Pre-Interview Communication", U.S. Appl. No. 15/343,067, Apr. 19, 2017, 3 pages.
"Textile Wire Brochure", Retrieved at: http://www.textile-wire.ch/en/home.html, Aug. 7, 2004, 17 pages.
Stoppa,"Wearable Electronics and Smart Textiles: A Critical Review", In Proceedings of Sensors, vol. 14, Issue 7, Jul. 7, 2014, pp. 11957-11992.
"Combined Search and Examination Report", GB Application No. 1620891.0, dated May 31, 2017, 9 pages.
"Corrected Notice of Allowance", U.S. Appl. No. 14/930,220, dated May 11, 2017, 2 pages.
"Final Office Action", U.S. Appl. No. 14/959,799, dated Jul. 19, 2017, 12 pages.
"Final Office Action", U.S. Appl. No. 14/518,863, dated May 5, 2017, 18 pages.
"First Action Interview Pilot Program Pre-Interview Communication", U.S. Appl. No. 14/731,195, dated Aug. 1, 2017, 3 pages.
"International Search Report and Written Opinion", Application No. PCT/US2016/063874, dated May 11, 2017, 19 pages.
"Non-Final Office Action", U.S. Appl. No. 15/403,066, dated May 4, 2017, 31 pages.
"Notice of Allowance", U.S. Appl. No. 15/343,067, dated Jul. 27, 2017, 9 pages.
"Notice of Allowance", U.S. Appl. No. 14/681,625, dated Jun. 7, 2017, 7 pages.
"Advisory Action", U.S. Appl. No. 14/504,139, dated Aug. 28, 2017, 3 pages.
"Final Office Action", U.S. Appl. No. 15/398,147, dated Jun. 30, 2017, 11 pages.
"Final Office Action", U.S. Appl. No. 14/874,955, dated Jun. 30, 2017, 9 pages.
"Final Office Action", U.S. Appl. No. 14/504,121, dated Aug. 8, 2017, 16 pages.
"Final Office Action", U.S. Appl. No. 14/959,901, dated Aug. 25, 2017, 19 pages.
"First Action Interview OA", U.S. Appl. No. 14/715,793, dated Jun. 21, 2017, 3 pages.
"Non-Final Office Action", U.S. Appl. No. 14/720,632, dated Jun. 14, 2017, 16 pages.
"Non-Final Office Action", U.S. Appl. No. 14/862,409, dated Jun. 22, 2017, 15 pages.
"Non-Final Office Action", U.S. Appl. No. 14/959,730, dated Jun. 23, 2017, 14 pages.

(56) References Cited

OTHER PUBLICATIONS

"Non-Final Office Action", U.S. Appl. No. 15/093,533, dated Aug. 24, 2017, 18 pages.
"Non-Final Office Action", U.S. Appl. No. 15/142,619, dated Aug. 25, 2017, 16 pages.
"Notice of Allowance", U.S. Appl. No. 14/513,875, dated Jun. 28, 2017, 7 pages.
"Notice of Allowance", U.S. Appl. No. 14/666,155, dated Jul. 10, 2017, 7 pages.
"Notice of Allowance", U.S. Appl. No. 14/504,038, dated Aug. 7, 2017, 17 pages.
Otto, et al., "System Architecture of a Wireless Body Area Sensor Network for Ubiquitous Health Monitoring", Journal of Mobile Multimedia; vol. 1, No. 4, Jan. 10, 2006, 20 pages.

\* cited by examiner

US 9,778,749 B2

OCCLUDED GESTURE RECOGNITION

PRIORITY APPLICATION

This application claims priority under 35 U.S.C. §119(e) to U.S. Provisional Patent Application No. 62/040,896, entitled "Occluded Gesture Recognition" and filed on Aug. 22, 2014, the disclosure of which is incorporated in its entirety by reference herein.

BACKGROUND

This background description is provided for the purpose of generally presenting the context of the disclosure. Unless otherwise indicated herein, material described in this section is neither expressly nor impliedly admitted to be prior art to the present disclosure or the appended claims.

Mobile computing devices continue to increase in popularity, as these devices are small, light, and often have substantial computing and communication capabilities. To enjoy these many capabilities, users desire seamless and near-constant control of their devices. Conventional techniques, however, do not permit seamless and near-constant control.

To address this desire, some other conventional techniques provide audio interfaces. These audio interfaces can help users control their devices when their hands are occupied and audio interference is minimal, such as when driving. These conventional techniques, however, often fail to understand a user's commands. Even when these conventional techniques do understand a user's commands, they fail to enable control in a large set of circumstances during which control is desired.

SUMMARY

This document describes techniques and devices for occluded gesture recognition. Through use of the techniques and devices described herein, users may control their devices even when a user's gesture is occluded by some material between the user's hands and the device itself. Thus, the techniques enable users to control their mobile devices in many situations in which control is desired but conventional techniques do permit effective control, such as when a user's mobile computing device is occluded by being in a purse, bag, pocket, or even in another room.

This summary is provided to introduce simplified concepts relating to occluded gesture recognition, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and devices for occluded gesture recognition are described with reference to the following drawings. The same numbers are used throughout the drawings to reference like features and components.

DETAILED DESCRIPTION

Overview

This document describes techniques and devices enabling occluded gesture recognition. These techniques and devices enable greater control of mobile devices through recognizing gestures when those gestures are occluded from the mobile device.

Consider, for example, a case where a user's smartphone is in her purse. The techniques enable her to control her smartphone without having to fumble through her purse to find her smartphone. Assume that she is in a meeting and her phone begins to ring loudly—rather than have it continue to ring until she finds the smartphone, gets it out of her purse, looks at her touch interface to find a control to mute the volume, and then selects the mute control—she instead makes a simple gesture "in the air" near her purse and her smartphone is immediately silent.

By way of another example, assume that a user is walking to work on a cold, rainy morning. Because of this, his media player is in his briefcase, protected from the rain, while he listens with earphones through a personal area network in communication with the media player. Rather than have to hold and interact with the media player, the techniques enable him to pause, adjust a volume, or advance to another song simply with a gesture made "in the air"—he need not touch his media player or even the earphones in his ears. The techniques even enable the user to make a gesture while his hands are in his jacket pockets, protected from the cold.

These are but two examples in which occluded gesture recognition can be performed. This document now turns to an example environment, after which example occluded-gesture recognition systems, example methods, and an example computing system are described.

Example Environment

Figure 1:
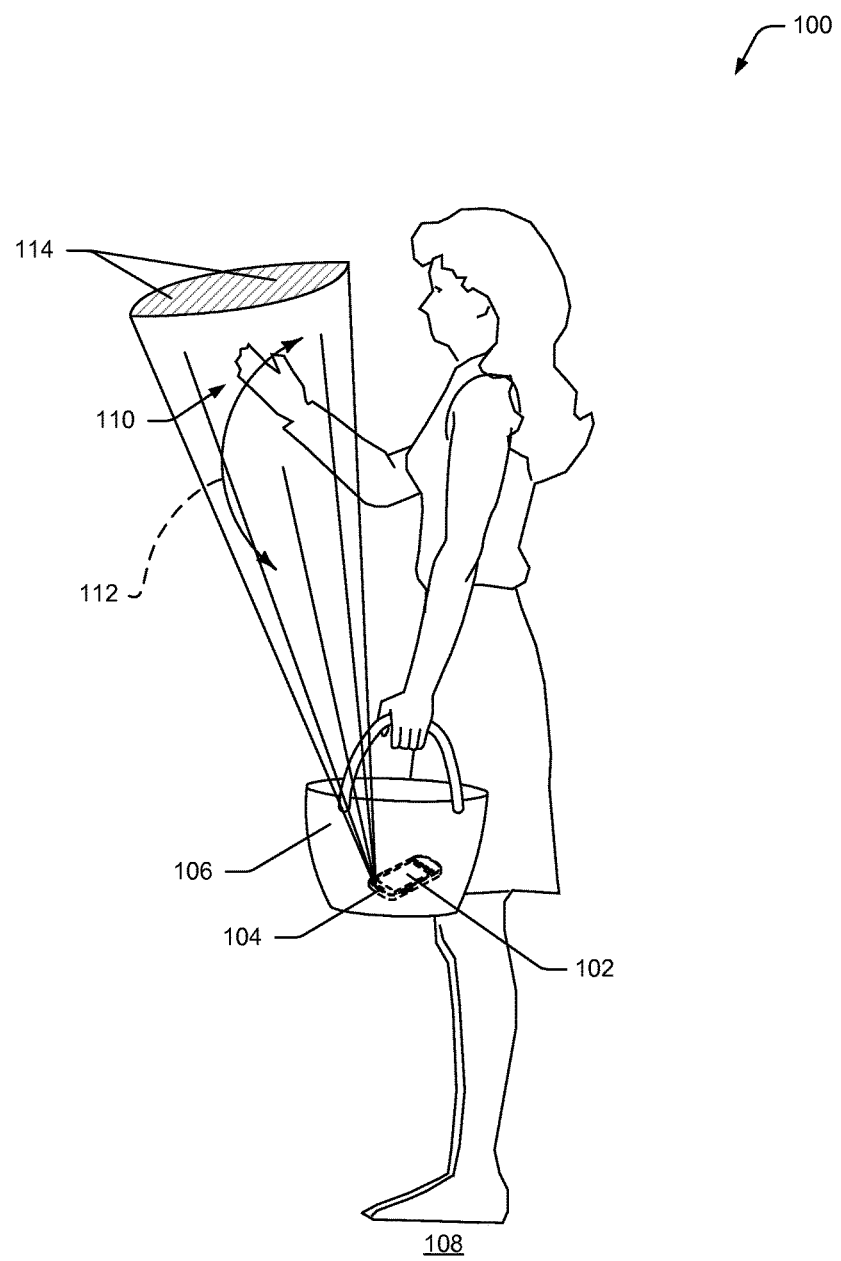
FIG. 1 illustrates an example environment in which occluded gesture recognition can be implemented.

FIG. 1 is an illustration of an example environment 100 in which techniques enabling occluded gesture recognition can be performed. Environment 100 includes a mobile computing device 102 having an occluded-gesture recognition system 104, a closed purse 106, a person 108, a hand 110 of person 108 performing an up-and-down gesture 112, and a radar field 114 generated by occluded-gesture recognition system 104. As shown, mobile computing device 102 is within closed purse 106 and thus hand 110 is occluded from mobile computing device 102 due to the material of closed purse 106. Radar field 114, described in detail below, is configured to penetrate various materials, such as wool, cotton, nylon, or leather, but reflect from human tissue of hand 110, thereby enabling recognition of occluded gestures.

Figure 2:
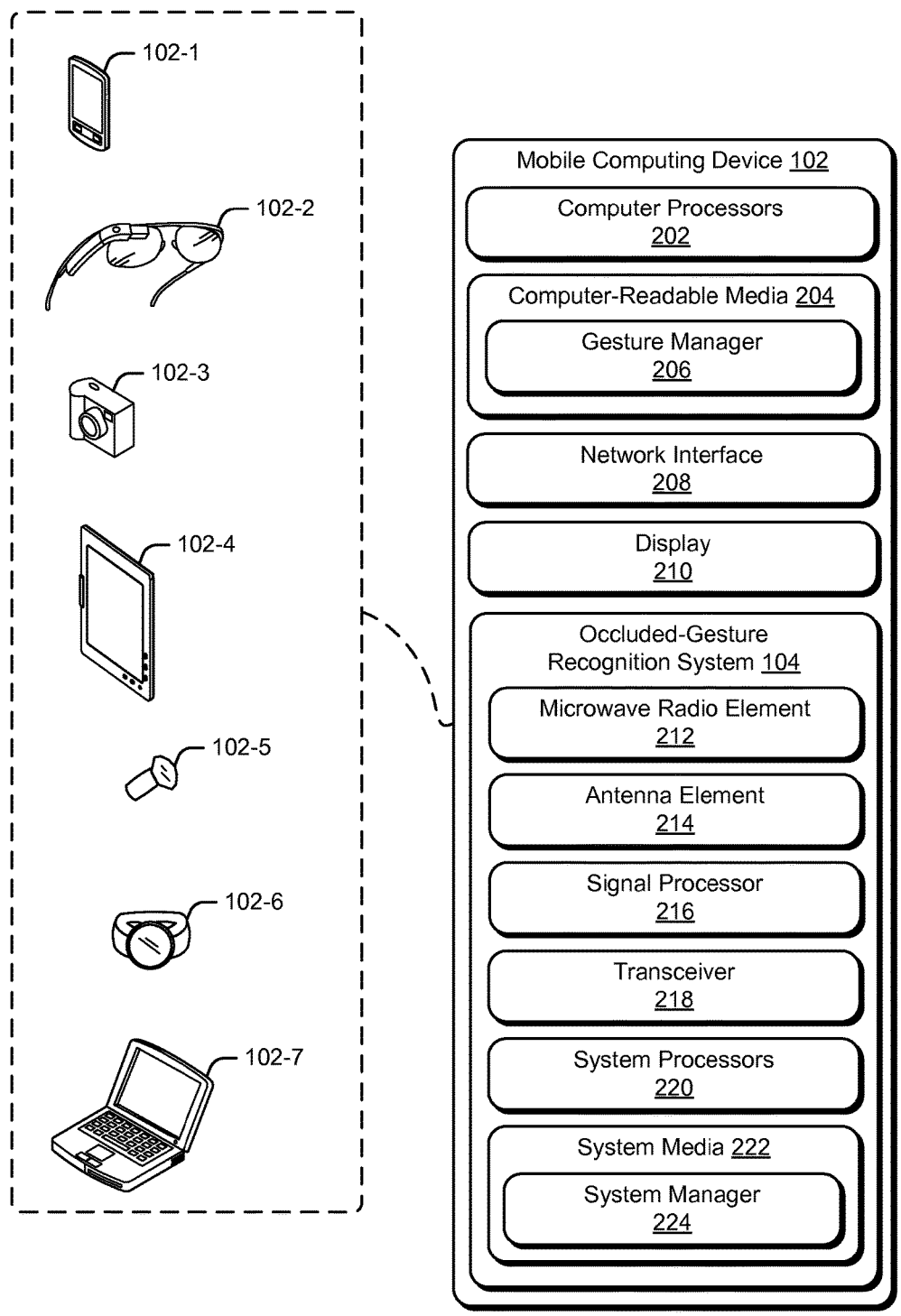
FIG. 2 illustrates the mobile computing device of FIG. 1 in greater detail.

In more detail, consider FIG. 2, which illustrates mobile computing device 102 including one or more computer processors 202 and computer-readable media 204, which includes memory media and storage media. Applications and/or an operating system (not shown) embodied as computer-readable instructions on computer-readable media 204 can be executed by processors 202 to provide some of the functionalities described herein. Computer-readable media 204 also includes gesture manager 206 (described below).

Computing device 102 may also include network interfaces 208 for communicating data over wired, wireless, or optical networks. By way of example and not limitation, network interface 208 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like. Mobile computing device 102 may also include a display 210, though this is not required.

Occluded-gesture recognition system 104, as noted above, is configured to sense gestures. To enable this, occluded-gesture recognition system 104 includes a microwave radio element 212, an antenna element 214, and a signal processor 216. Generally, microwave radio element 212 is configured to provide a radar field that is capable of penetrating some materials, such as textiles, and reflecting from other materials, such as human tissue. While examples shown herein generally show one occluded-gesture recognition system 104 per device, multiples can be used, thereby increasing a number and complexity of gestures, as well as accuracy, resolution, and robust recognition.

This radar field can be large or small and be widely dispersed or narrowly directed (e.g., focused). In some cases described below, the radar field is directed to a particular user's hands, which can improve accuracy, reduce power costs, and/or direct reception of gestures to those of an identified hand.

Microwave radio element 212 can be configured to emit continuously modulated radiation, ultra-wideband radiation, or sub-millimeter-frequency radiation. Microwave radio element 212, in some cases, is configured to form radiation in beams, the beams aiding antenna element 214 and signal processor 216 to determine which of the beams are interrupted, and thus locations of interactions (e.g., by a hand) within the radar field. In more detail, microwave radio element 212 can be configured to emit microwave radiation in a 1 GHz to 300 GHz range, as well as 57 GHz to 63 GHz, to provide the radar field. This range affects antenna element 214's ability to sense interactions, such as to track locations of two or more targets to a resolution of about two to about 25 millimeters. Microwave radio element 212 can be configured, along with other entities of occluded-gesture recognition system 104, to have a relatively fast update rate, which can aid in resolution of the interactions. By selecting particular frequencies, occluded-gesture recognition system 104 can operate to substantially penetrate clothing while not substantially penetrating human tissue.

Antenna element 214 is configured to receive reflections of, or sense interactions in, the radar field, and signal processor 216 is configured to process the reflections or sensed interactions in the radar field sufficient to provide gesture data usable to determine a gesture from the sensed interactions. Antenna element 214 can include one or many sensors, such as an array of radiation sensors, the number in the array based on a desired resolution and whether the field is a surface, plane, or volume. Alternately or additionally, antenna element 214 may include one or many antennas, such as an array of antennas, directional or otherwise, coupled with respective radiation sensors and/or signal processor 216.

Further, antenna element 214 or signal processor 216 can be configured to differentiate between interactions in the radar field caused by clothing from those interactions in the radar field caused by human tissue. Thus, a user with a smartphone 102-1 (that includes occluded-gesture recognition system 104) that is placed within a jacket or shirt pocket covering microwave radio element 212, and even with hands wearing gloves or in another pocket may still control the mobile computing device 102 through use of occluded-gesture recognition system 104.

The field provided by microwave radio element 212 can be a three-dimensional (3D) volume (e.g., hemisphere, cube, cylinder, cone), a plane, or a surface applied to human tissue or non-human object. In the case of a 3D volume, antenna element 214 is configured to sense interactions in the 3D volume of multiple targets (e.g., two hands, fingers of one or two hands, etc.), and signal processor 216 is configured to process the sensed interactions in the 3D volume sufficient to provide gesture data usable to determine gestures in three dimensions.

Figure 3:
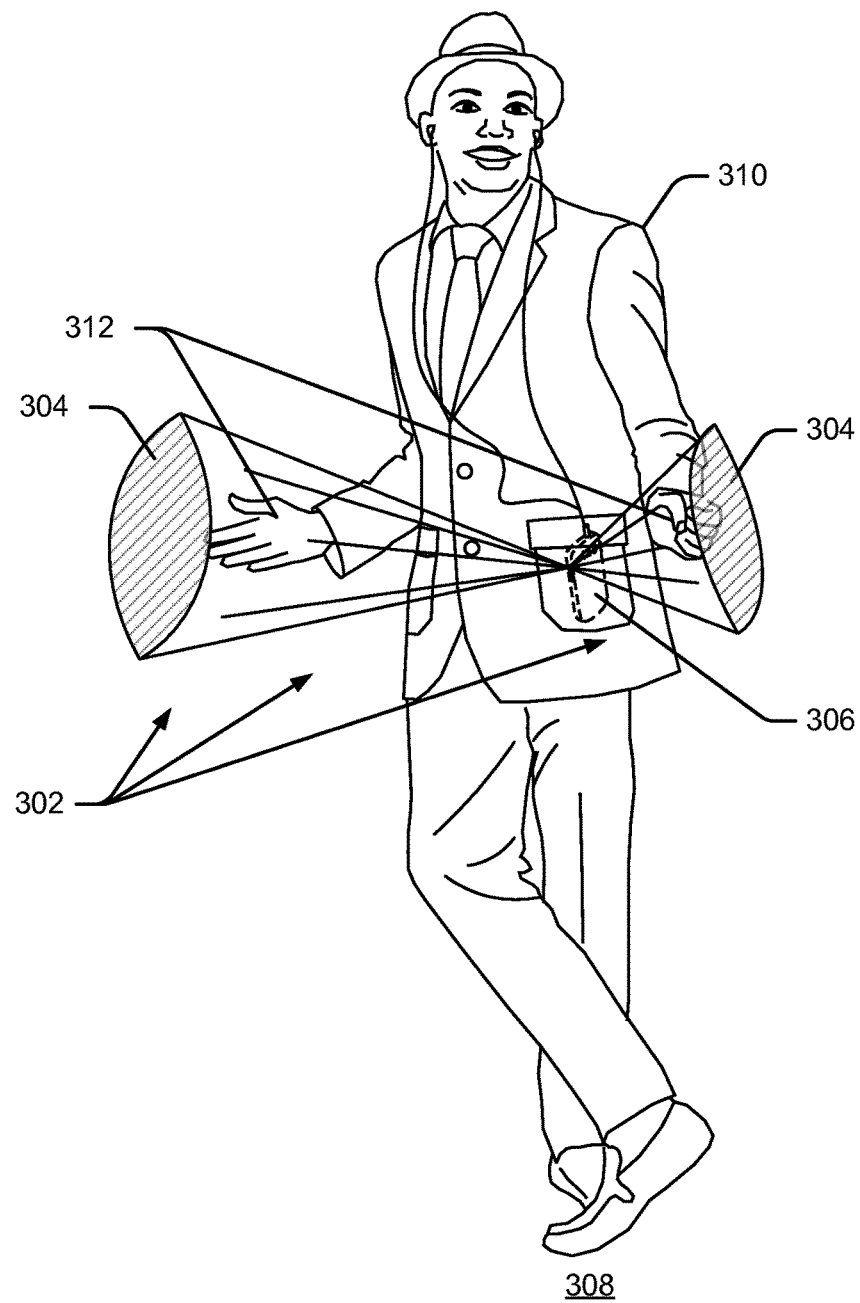
FIG. 3 illustrates an example 3D volume radar field emitted by the occluded-gesture recognition system of FIG. 2 as a volumetric cone.

An example of a 3D volume is illustrated in FIG. 3, which shows a 3D volume radar field 302, formed as two volumetric cones 304 and emitted by occluded-gesture recognition system 104 of media player 306. Note that media player 306 is placed within, and occluded by, fabric of man 308's jacket 310. As described later below, 3D volume radar field 302 can be directed toward particular locations, such as through tracking of man 308's hands 312.

With 3D volume radar field 302, a user may perform complex or simple gestures with a hand or device (e.g., a stylus) that interrupts the volume. Example gestures include the many gestures usable with current touch-sensitive displays, such as swipes, two-finger pinch and spread, tap, and so forth. Other gestures are enabled that are complex, or simple but three-dimensional, examples include the many sign-language gestures, e.g., those of American Sign Language (ASL) and other sign languages worldwide. A few of these include an up-and-down fist, which in ASL means "Yes", an open index and middle finger moving to connect to an open thumb, which means "No", a flat hand moving up a step, which means "Advance", a flat and angled hand moving up and down, which means "Afternoon", clenched fingers and open thumb moving to open fingers and an open thumb, which means "taxicab", an index finger moving up in a roughly vertical direction, which means "up", and so forth. These are but a few of many gestures that can be mapped to particular devices or applications, such as the "Advance" gesture to skip to another song being played by media player 306 through an occluded gesture performed by man 308's hand 312.

Figure 4:
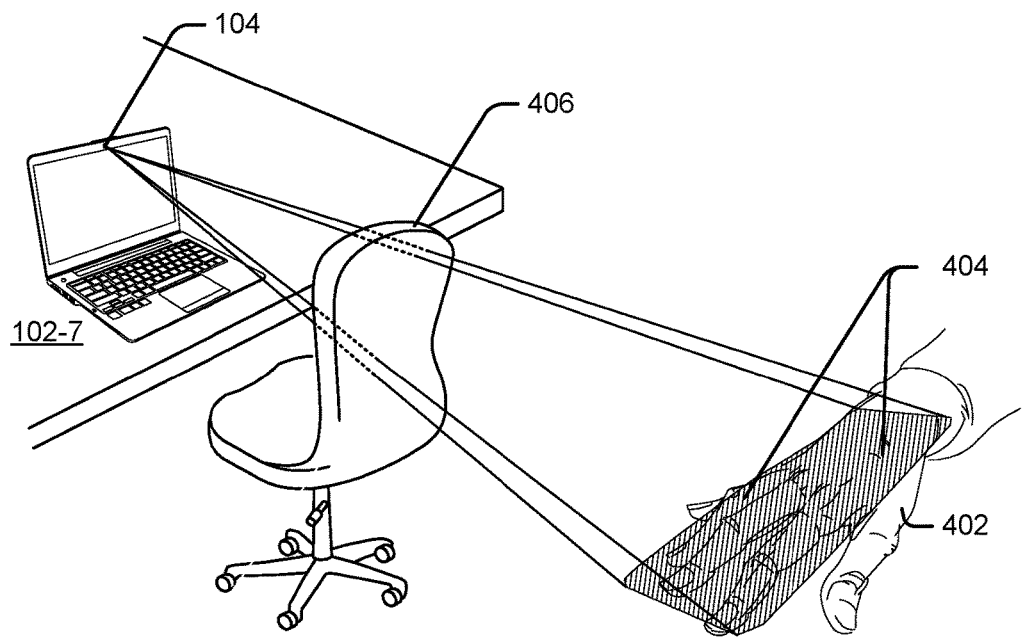
FIG. 4 illustrates an example surface radar field emitted by the occluded-gesture recognition system of FIG. 2.

The radar field can also include a surface applied to human tissue. This is illustrated at FIG. 4, which shows hand 402 having a surface radar field 404 provided by occluded-gesture recognition system 104 of laptop 102-7. Radio emitter 212 (not shown) provides surface radar field 404 penetrating chair 406 and applied to hand 402. In this case, antenna element 214 (not shown) is configured to receive a reflection caused by an interaction on the surface of hand 402 that penetrates (e.g., reflects back through) chair 406 and signal processor 216 is configured to process the received reflection on the surface sufficient to provide gesture data usable to determine a gesture. Note that with surface radar field 404, another hand may interact to perform gestures, such as to tap on the surface on hand 402, thereby interacting with surface radar field 404. Example gestures include single and multi-finger swipe, spread, squeeze, non-linear movements, and so forth. Or hand 402 may simply move or change shape to cause reflections, thereby also performing an occluded gesture.

Gestures can be mapped to various control inputs, thereby enabling control of many devices and applications. Many complex and unique gestures can be recognized by occluded-gesture recognition systems 104, thereby permitting precise and/or single-gesture control, even for multiple applications. Occluded-gesture recognition systems 104, while shown integral with mobile computing device 102, can be instead be part of a device having few or no computing capabilities, instead providing gesture data to be recognized and/or mapped to a control input. Occluded-gesture recognition system 104 can communicate with other devices through network interface 208 through a network, such as one or more of many types of wireless or partly wireless communication networks, such as a local-area-network (LAN), a wireless local-area-network (WLAN), a personal-area-network (PAN), a wide-area-network (WAN), an intranet, the Internet, a peer-to-peer network, point-to-point network, a mesh network, and so forth.

Mobile computing device 102 is illustrated with various non-limiting example devices: smartphone 102-1, computing spectacles 102-2, camera 102-3, tablet 102-4, computing bracelet 102-5, computing ring 102-6, and laptop 102-7, though other devices may also be used, such as wearable devices such as a brooch or necklace, netbooks, and e-readers.

Occluded-gesture recognition system 104 also includes a transceiver 218 configured to transmit gesture data to a remote device, such as in cases where occluded-gesture recognition system 104 is not integrated with mobile computing device 102. Gesture data can be provided in a format usable by the receiving device sufficient to recognize a gesture using the gesture data.

Occluded-gesture recognition system 104 may also include one or more system processors 220 and system media 222 (e.g., one or more computer-readable storage media). System media 222 includes system manager 224, which can perform various operations, including determining a gesture based on gesture data from signal processor 216, mapping the determined gesture to a pre-configured control gesture associated with a control input for an application associated with remote device, and causing transceiver 218 to transmit the control input to the remote device effective to enable control of the application or device. This is but one of the ways in which the above-mentioned control through occluded-gesture recognition system 104 can be enabled. Operations of system manager 224 are provided in greater detail as part of methods 5 and 6 below.

These and other capabilities and configurations, as well as ways in which entities of FIGS. 1-4 act and interact, are set forth in greater detail below. These entities may be further divided, combined, and so on. The environment 100 of FIG. 1 and the detailed illustrations of FIGS. 2-4 illustrate some of many possible environments and devices capable of employing the described techniques.

Example Methods

Figure 5:
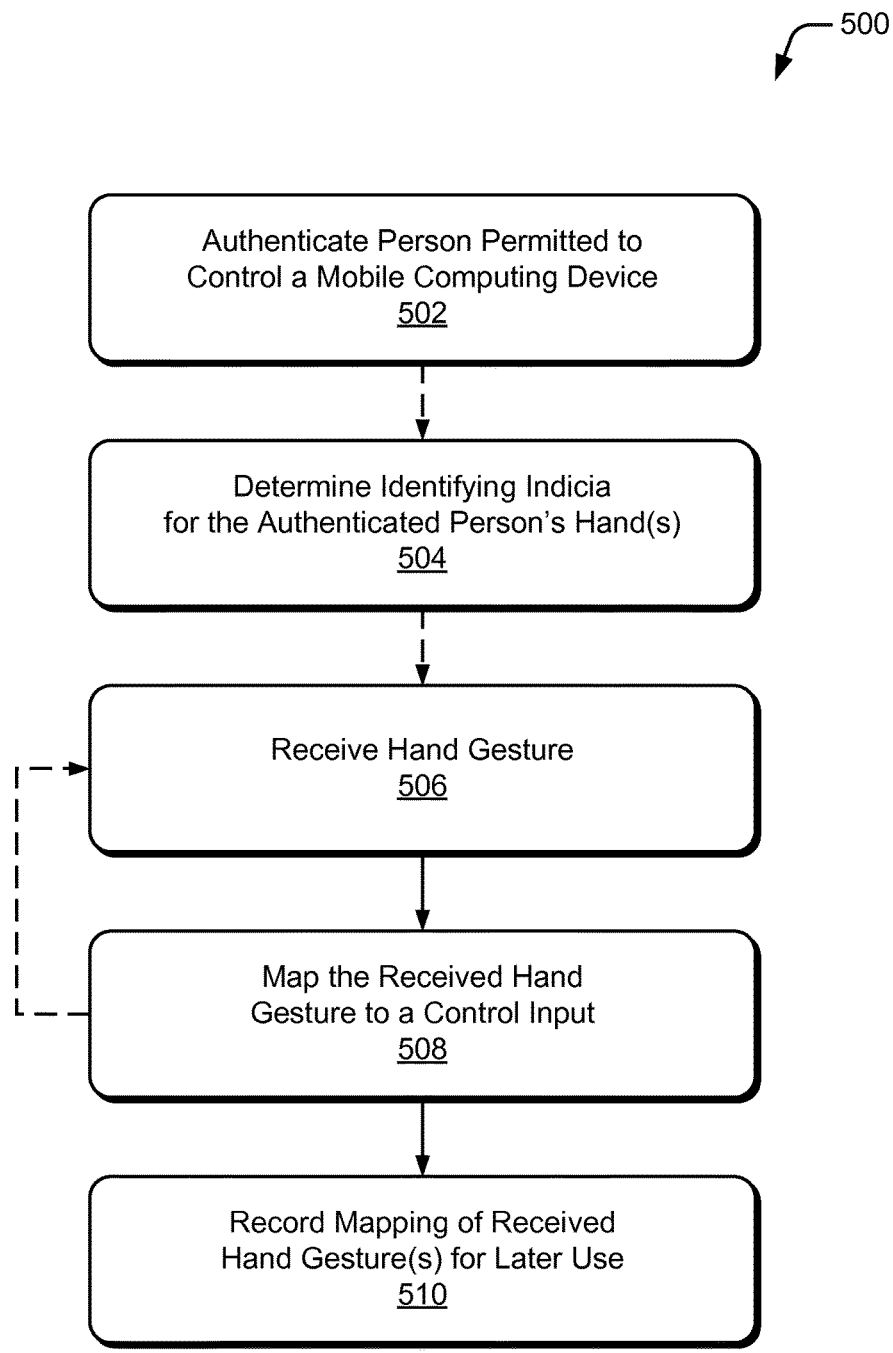
FIG. 5 illustrates an example method enabling better recognition of an occluded gesture by mapping gestures to control inputs for an authenticated person.
Figure 6:
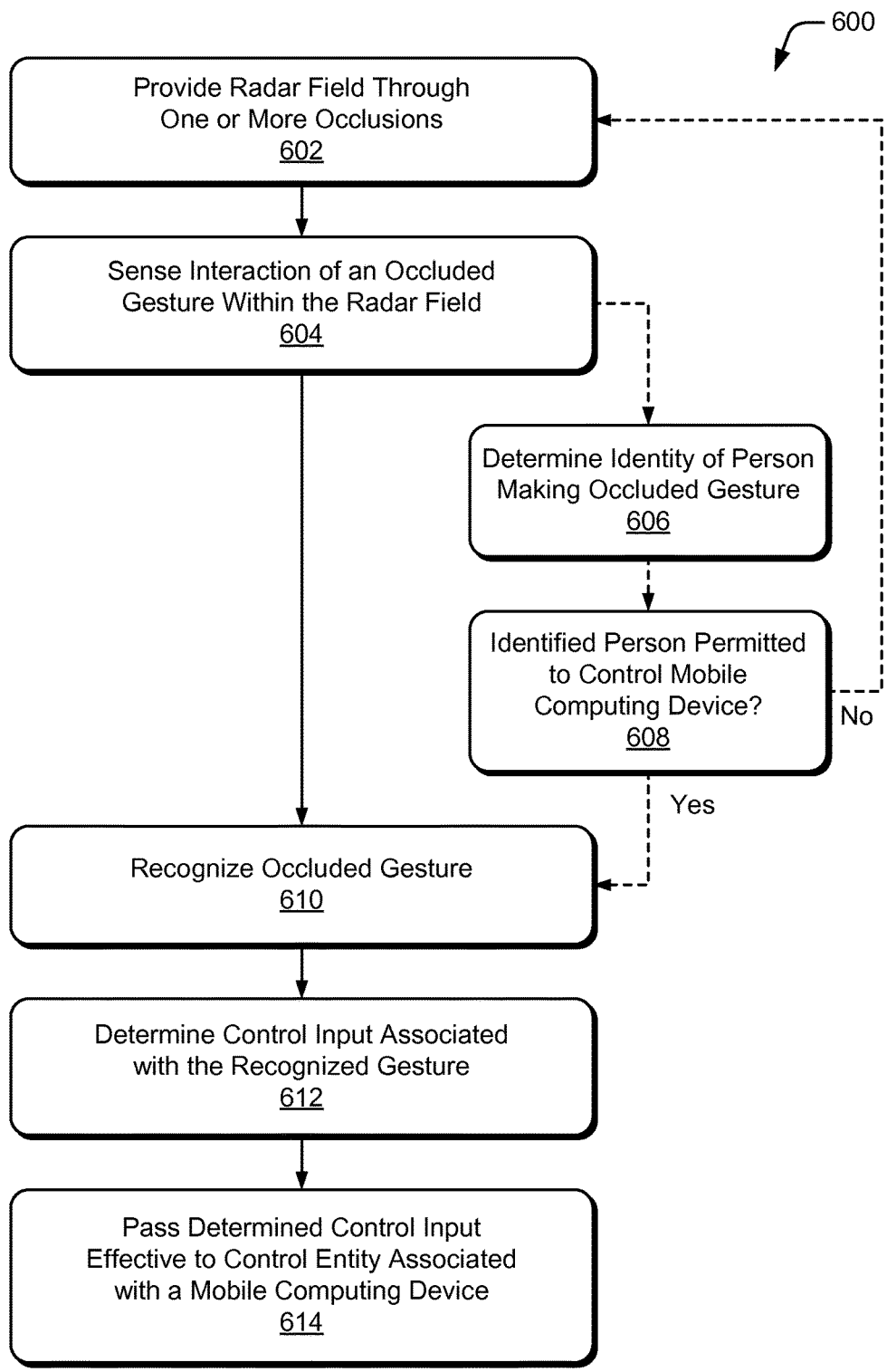
FIG. 6 illustrates an example method enabling occluded gesture recognition.

FIGS. 5 and 6 depict methods 500 and 600. Method 500 can be performed to better enable later recognition of an occluded gesture by mapping gestures to control inputs for an authenticated person. Method 600 enables occluded gesture recognition, and can be performed separate from or integrated in whole or in part with method 500. These methods and other methods herein are shown as sets of operations (or acts) performed but are not necessarily limited to the order or combinations in which the operations are shown herein. Further, any of one or more of the operations may be repeated, combined, reorganized, or linked to provide a wide array of additional and/or alternate methods. In portions of the following discussion reference may be made to environment 100 of FIG. 1 and entities detailed in FIGS. 2-4, reference to which is made for example only. The techniques are not limited to performance by one entity or multiple entities operating on one device.

At 502 a person permitted to control a mobile computing device is authenticated. This authentication can be performed in various manners known in the art of authenticating persons generally, such as receiving authentication credentials and confirming that these credentials match the person.

In some cases, however, authenticating the person permitted to control the mobile computing device authenticates a person based on identifying indicia. For example, gesture manager 206 may provide a radar field, receive a human-tissue reflection, determine identifying indicia based on the human-tissue reflection, and confirm that the identifying indicia matches recorded identifying indicia for the person permitted to control the mobile computing device. These identifying indicia can include various biometric identifiers, such as a size, shape, ratio of sizes, cartilage structure, and bone structure for the person or a portion of the person, such as the person's hand. These identify indicia may also be associated with a device worn by the person permitted to control the mobile computing device, such as device having a unique or difficult-to-copy reflection (e.g., a wedding ring of 14 carat gold and three diamonds, which reflects radar in a particular manner).

At 504, identifying indicia for a hand of the authenticated person is determined. This identifying indicia can be the indicia used for authentication at operation 502, though that is not required. Thus, in some cases the identifying indicia for the hand of the authenticated person includes providing a radar field, receiving multiple human-tissue reflections caused by the hand within the radar field, and determining the identifying indicia for the hand based on the multiple human-tissue reflections.

At 506, a hand gesture of the authenticated person's hand is received. In some cases the hand gesture is received responsive to presenting a proposed gesture and a proposed control input to cause with the proposed gesture. Thus, gesture manager 206 may present a gesture and its corresponding control input, such as in text: "make a flicking gesture" or showing an animation or video of the gesture, and then receive the gesture made by the authenticated person. This hand gesture can then be recorded as an aid in improved recognition, as the manner in which the gesture is made can vary from person to person. To do so, gesture manager 206 may provide a radar field, receive human-tissue reflections caused by the hand gesture within the radar field, and record gesture-specific indicia for the hand gesture based on the human-tissue reflections. These gestures may also be responsive to presentation of one or more control inputs and then receiving a gesture that is desired for use as that control. This permits users to decide the gesture that they want to use, such as a two-finger flick to advance media or pages of a document, a slashing movement to mute volume, or the various ASL gestures as noted above.

At 508, the received hand gesture is mapped to a control input. This can be the control input already associated with a presented gesture, or a new gesture selected to be mapped to a control input, and so forth. This mapping can be as simple as a look-up table, for example, whether personalized and custom or otherwise.

At 510, the identifying indicia and the mapping of the received hand gesture are recorded. This recordation is effective to enable a later-received hand gesture to be authenticated as from the person permitted to control the mobile computing device and mapped to the control input.

Method 600 enables occluded gesture recognition, thereby enabling recognition of gestures where the gesture actor (e.g., a hand, arm, or stylus) is occluded from a mobile computing device.

At 602, a radar field is provided through one or more occlusions, such as in the various manners noted above. Gesture manager 206 and/or system manager 224 directs the radar field to a user's hand, hands, or other gesture-making device or appendage. In one such case, the techniques provide the radar field direct to a region in which gestures are anticipated. This direction can be determined based on a location and/or orientation of the mobile computing device relative to a location of a person known to be associated with the mobile computing device. Thus, a mobile computing device within a front pocket of a person's shirt on the right side can determine this location and, based on it, determine a likely location of the user's hands. In such a case, the mobile computing device may also determine an orientation of the device relative to the person, such as through the use of accelerometers, acoustic sensors, thermal sensors, light sensors (e.g., front/rear facing cameras), and the like.

In another case, gesture manager 206 and/or system manager 224 tracks the particular person's hands after authentication by methods 500. Thus, the person is authenticated at a particular time and a position or location of his or her hands are tracked from that time until some later operation of method 600. By so doing, the hands' locations are known, which aids in responsive recognition as well as ensuring that control is permitted by a person having the right to control the mobile device.

Directing the radar field can also save power, as the radar field can be smaller than a more-general radar field occupying a larger volume. The location of the person's hand, for example, can be determined responsive to identifying the hand based on identifying indicia of the hand as described above. Occluded-gesture recognition system 104 may then track the hand to provide a directed radar field. In cases where the person is authenticated without using identifying indicia (e.g., by entry of a password), the identifying indicia can simply be a reliable manner of tracking the person's hand or hands, which may involve biometrics, or sufficient information about the hand to continue to track the hand, which is not necessarily information sufficient to authenticate it.

At 604, an interaction of an occluded gesture is sensed within the radar field. This interaction includes the many noted above, such as a up-and-down first to represent a "Yes" selection, a two-finger tap gesture, or a two-handed gesture, such as tapping opposing index, middle, and thumbs against each other through a plane or volume to represent an "eat" entry, as is the meaning in some sign languages. The sensed interaction can be processed by signal processor 216, which may provide gesture data for later determination as to the gesture intended, such as by system manager 224 or gesture manager 206 as noted herein.

Following 604, method 600 may proceed to operations 606 and 608, though this is optional. At 606, an identity of a person making the occluded gesture is determined. This determination can be made based on identifying indicia as described in detail above for the hand or appendage or after determining the identity of the person and that the person's hand is making the gesture. This identifying can be immediate or part of a prior credential authentication and then an ongoing tracking of the person or a hand that performs the occluded gesture. At 608, method 600 proceeds along "No" path to operation 602 if the person is not identified as being permitted to control the mobile computing device or along the "Yes" path to operation 610 if the person is identified as permitted to control the mobile computing device.

At 610, the occluded gesture is recognized, such as in the various manners described above. This occluded gesture can be recognized through one or more occlusions, such as wool for a wool jacket, denim for jeans, cotton for a blouse or shirt, or more-substantial occlusions, such as glass or wood furniture, covering and framing of a couch, or fiber-board wall in a home or apartment.

At 612, a control input associated with the recognized gesture is determined. Determining the control input associated with the recognized gesture can be based on a mapping of the recognized gesture to a control input or multiple control inputs previously associated with gestures. If there is more than one control input mapped to the recognized gesture, gesture manager 206 can determine which control input to associate the recognized gesture with based on other factors. These other factors may include control inputs associated with a currently executing program, a device having recently received a control input from the person, a most-common application or device for the user to control, various other historic data, and so forth.

At 614, the determined control input is passed to an entity effective to control the entity. As noted, this entity can be an operating system or application associated with mobile computing device 102, though it may also be passed to a remote device directly from occluded-gesture recognition system 104 or through mobile computing device 102.

Thus, a user may make a gesture to pause playback of media on a remote device and, at 614, the gesture is passed to the remote device effective to pause the playback. In some embodiments, therefore, occluded-gesture recognition system 104 and these techniques enable implementation of a universal controller for televisions, media devices, computers, appliances, and so forth.

In cases where operations 606 and 608 are performed, passing the control input or some prior operations is responsive to determining that the identified person is permitted to control the mobile computing device. By so doing control is not permitted by some other person, whether by accident or for malicious intent.

The preceding discussion describes methods relating to occluded gesture recognition. Aspects of these methods may be implemented in hardware (e.g., fixed logic circuitry), firmware, software, manual processing, or any combination thereof. These techniques may be embodied on one or more of the entities shown in FIGS. 1-4 and 7 (computing system 700 is described in FIG. 7 below), which may be further divided, combined, and so on. Thus, these figures illustrate some of the many possible systems or apparatuses capable of employing the described techniques. The entities of these figures generally represent software, firmware, hardware, whole devices or networks, or a combination thereof.

Example Computing System

Figure 7:
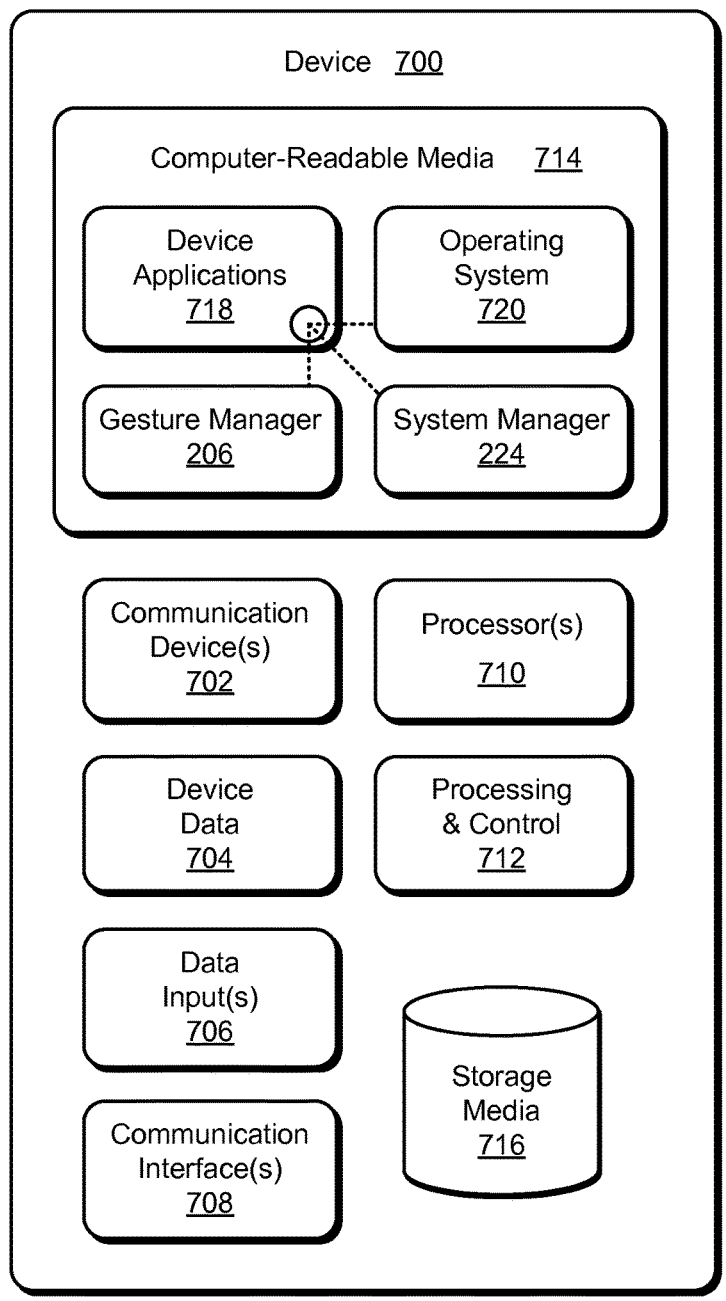
FIG. 7 illustrates an example device embodying, or in which techniques may be implemented that enable use of, occluded gesture recognition.

FIG. 7 illustrates various components of example computing system 700 that can be implemented as any type of client, server, and/or computing device as described with reference to the previous FIGS. 1-6 to implement an occluded gesture recognition. In embodiments, computing system 700 can be implemented as one or a combination of a wired and/or wireless wearable device, System-on-Chip (SoC), and/or as another type of device or portion thereof. Computing system 700 may also be associated with a user (e.g., a person) and/or an entity that operates the device such that a device describes logical devices that include users, software, firmware, and/or a combination of devices.

Computing system 700 includes communication devices 702 that enable wired and/or wireless communication of device data 704 (e.g., received data, data that is being received, data scheduled for broadcast, data packets of the data, etc.). Device data 704 or other device content can include configuration settings of the device, media content stored on the device, and/or information associated with a user of the device. Media content stored on computing system 700 can include any type of audio, video, and/or image data. Computing system 700 includes one or more data inputs 706 via which any type of data, media content, and/or inputs can be received, such as human utterances, interactions with a radar field, user-selectable inputs (explicit or implicit), messages, music, television media content, recorded video content, and any other type of audio, video, and/or image data received from any content and/or data source.

Computing system 700 also includes communication interfaces 708, which can be implemented as any one or more of a serial and/or parallel interface, a wireless interface, any type of network interface, a modem, and as any other type of communication interface. Communication interfaces 708 provide a connection and/or communication links between computing system 700 and a communication network by which other electronic, computing, and communication devices communicate data with computing system 700.

Computing system 700 includes one or more processors 710 (e.g., any of microprocessors, controllers, and the like), which process various computer-executable instructions to control the operation of computing system 700 and to enable techniques for, or in which can be embodied, occluded gesture recognition. Alternatively or in addition, computing system 700 can be implemented with any one or combination of hardware, firmware, or fixed logic circuitry that is implemented in connection with processing and control circuits which are generally identified at 712. Although not shown, computing system 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Computing system 700 also includes computer-readable media 714, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Computing system 700 can also include a mass storage media device 716.

Computer-readable media 714 provides data storage mechanisms to store device data 704, as well as various device applications 718 and any other types of information and/or data related to operational aspects of computing system 700. For example, an operating system 720 can be maintained as a computer application with computer-readable media 714 and executed on processors 710. Device applications 718 may include a device manager, such as any form of a control application, software application, signal-processing and control module, code that is native to a particular device, a hardware abstraction layer for a particular device, and so on.

Device applications 718 also include any system components, engines, or managers to implement occluded gesture recognition. In this example, device applications 718 include gesture manager 206 and system manager 224.

Conclusion

Although embodiments of techniques using, and apparatuses enabling, occluded gesture recognition have been described in language specific to features and/or methods, it is to be understood that the subject of the appended claims is not necessarily limited to the specific features or methods described. Rather, the specific features and methods are disclosed as example implementations enabling occluded gesture recognition.

What is claimed is:

1. A computer-implemented method comprising:
   authenticating a person permitted to control a mobile computing device based on authentication credentials;
   providing a radar field using microwave radiation;
   receiving, via the provided radar field, a reflection from a hand of the authenticated person;
   determining identifying indicia for the hand of the authenticated person based on the received reflection;
   recording the identifying indicia effective to enable a later-received radar field reflection from the hand to be identified as being from the authenticated person;
   determining a hand gesture of the authenticated person's hand based on the received reflection;
   mapping the determined hand gesture to a control input; and
   recording the mapping of the determined hand gesture effective to enable a later-received hand gesture to be mapped to the control input.

2. The computer-implemented method of claim 1, wherein the received reflection is received responsive to presentation of a proposed gesture and a proposed control input to cause with the proposed gesture.

3. The computer-implemented method of claim 1, wherein mapping the determined hand gesture is responsive to a user selection of the control input to be controlled through the determined hand gesture.

4. The computer-implemented method of claim 1, wherein the received reflection includes a human-tissue reflection and wherein determining the identifying indicia for the hand is based on the received human-tissue reflection.

5. The computer-implemented method of claim 1, wherein the received reflection includes a reflection from a device worn on the hand of the authenticated person and wherein determining the identifying indicia for the hand is based on the received reflection from the device.

6. The computer-implemented method of claim 1, wherein the hand gesture includes a sign-language gesture.

7. The computer-implemented method of claim 1, wherein the hand gesture includes a finger gesture.

8. A computer-implemented method comprising:
   providing, at a mobile computing device, a radar field through one or more occlusions, the radar field having microwave radiation effective to penetrate through the one or more occlusions;
   receiving, at the mobile computing device, a reflection from an occluded gesture within the radar field;
   determining, based on the received reflection, identifying indicia of a person making the occluded gesture;

determining, based on the identifying indicia, that the person making the occluded gesture is permitted to control the mobile computing device;

recognizing the occluded gesture based on the received reflection;

determining a control input associated with the recognized gesture; and passing the determined control input effective to control an entity associated with the mobile computing device.

9. The computer-implemented method of claim 8, wherein providing the radar field provides a directed radar field in a region in which gestures are anticipated.

10. The computer-implemented method of claim 9, wherein the region in which gestures are anticipated is determined based on a location of the mobile computing device relative to a location of a person known to be associated with the mobile computing device.

11. The computer-implemented method of claim 10, further comprising determining the location of the person known to be associated by identifying a hand of the person known to be associated with the mobile computing device.

12. The computer-implemented method of claim 9, wherein a direction of the directed radar field is determined based on tracking a hand of the person known to be associated with the mobile computing device.

13. The computer-implemented method of claim 8, wherein determining the control input associated with the recognized gesture maps the recognized gesture to one control input of multiple control inputs previously associated with multiple respective gestures.

14. The computer-implemented method of claim 8, wherein the one or more occlusions include glass or wood furniture.

15. The computer-implemented method of claim 8, wherein the operation of determining that the person making the occluded gesture is permitted to control the mobile computing device compares the determined identifying indicia of the person making the occluded gesture with a recorded identifying indicia effective to authenticate the person making the occluded gesture.

16. The computer-implemented method of claim 8, wherein determining that the person making the occluded gesture is permitted to control the mobile computing device is based on tracking the person using a radar field after a credential-based authentication of the person and wherein the tracking is based on the identifying indicia of the person.

17. An apparatus comprising:
an occluded-gesture recognition system comprising a microwave radio element configured to provide a radar field having microwave radiation;

one or more computer processors; and one or more computer-readable storage media having instructions stored thereon that, responsive to execution by the one or more computer processors, perform operations comprising:

detecting a gesture actor interacting with the radar field provided by the occluded gesture recognition system;

determining, based on a reflection from the radar field, identifying indicia for a person associated with the gesture actor;

identifying, based on the identifying indicia, the person associated with the gesture actor;

determining that the identified person is permitted to control the apparatus; and responsive to determining that the identified person is permitted to control the apparatus, passing a control input determined, based on the interaction or another interaction by the gesture actor with the radar field, to an entity associated with the apparatus, the passing of the control input effective to control the entity.

18. The apparatus as recited in claim 17, wherein the operation of identifying the person associated with the gesture actor compares the identifying indicia for the the person associated with the gesture actor with a recorded identifying indicia for the person permitted to control the apparatus.

19. The apparatus as recited in claim 17, wherein the provided radar field penetrates through an occlusion and wherein the operations of detecting the gesture actor and determining the identifying indicia are based on the reflection from the radar field received through the occlusion.

20. The apparatus as recited in claim 17, wherein identifying the person associated with the gesture actor is based on a prior credential-based authentication at a particular time and tracking of the person using the identifying indicia from the particular time to a later time at which detecting the gesture actor is performed.

* * * * *

UNITED STATES PATENT AND TRADEMARK OFFICE
CERTIFICATE OF CORRECTION

PATENT NO. : 9,778,749 B2
APPLICATION NO. : 14/494863
DATED : October 3, 2017
INVENTOR(S) : Ivan Poupyrev It is certified that error appears in the above-identified patent and that said Letters Patent is hereby corrected as shown below:

In the Claims

Column 12, Line 30, after "for" before "the" delete "the"

Signed and Sealed this
Twenty-seventh Day of March, 2018

Andrei Iancu
*Director of the United States Patent and Trademark Office*